United States Patent
Kleven (10) Patent No.: US 6,543,297 B1
(45) Date of Patent: Apr. 8, 2003

(54) PROCESS FLOW PLATE WITH TEMPERATURE MEASUREMENT FEATURE

(75) Inventor: Lowell Kleven, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/395,688

(22) Filed: Sep. 13, 1999

(51) Int. Cl.[7] .................................................. G01F 1/37
(52) U.S. Cl. .................................. 73/861.52; 73/861.61
(58) Field of Search ........................ 73/861.42–861.65, 73/202.65

(56) References Cited

U.S. PATENT DOCUMENTS

| | | | |
|---|---|---|---|
| 2,943,640 A | 7/1960 | James | 137/594 |
| 3,817,283 A | 6/1974 | Hewson | |
| 4,193,420 A | 3/1980 | Hewson | 137/356 |
| 4,249,164 A | * 2/1981 | Tivy | 340/870.3 |
| 4,319,492 A | 3/1982 | Hewson et al. | 73/756 |
| 4,466,290 A | 8/1984 | Frick | 73/756 |
| 4,736,763 A | 4/1988 | Britton et al. | 137/10 |
| 4,745,810 A | 5/1988 | Pierce et al. | 73/706 |
| 4,932,269 A | 6/1990 | Cammarata, III et al. | 73/861.61 |
| 5,036,711 A | 8/1991 | Good | 73/861.66 |
| 5,085,250 A | 2/1992 | Kendrick | 138/44 |
| 5,469,749 A | * 11/1995 | Shimada et al. | 73/861.47 |
| 5,591,922 A | 1/1997 | Segeral et al. | 73/861.04 |
| 5,708,211 A | 1/1998 | Jepson et al. | 73/861.04 |
| 5,710,370 A | 1/1998 | Shanahan et al. | 73/1.35 |
| 5,773,726 A | 6/1998 | Mahoney et al. | 73/861.65 |
| 5,817,950 A | 10/1998 | Wiklund et al. | 73/861.66 |
| 5,908,990 A | 6/1999 | Cummings | 73/861.22 |
| 6,119,529 A | 9/2000 | Di Marco et al. | 73/861.68 |
| 6,236,948 B1 | 4/2001 | Eck et al. | 702/45 |
| 6,311,136 B1 | 10/2001 | Henry et al. | 702/45 |
| 6,327,914 B1 | 12/2001 | Dutton | 73/861.356 |

FOREIGN PATENT DOCUMENTS

| | | |
|---|---|---|
| DE | 0 686 831 | 12/1995 |
| EP | 0 887 626 A1 | 6/1998 |
| GB | 1467957 | 3/1977 |
| GB | 2 301 676 | 12/1996 |
| JP | 57-198823 | 12/1982 |
| JP | 04-225126 | 8/1992 |
| JP | 06-213694 | 1/1994 |

OTHER PUBLICATIONS

Model 8800A Vortex Flowmeter, Key Differentiators (undated).

Model 1195 Integral Orifice Assembly, Rosemount Catalog pp. Flow–125—Flow 137 (Published 1995).

Model 8800 Smart Vortex Flowmeter, Fisher–Rosemount, Managing the Process Better, pp. 2–19, (1994).

Model 8800A Smart Vortex Flowmeter, Fisher–Rosemount, Managing the Process Better, pp. 2–21 (1997).

Process Instrument Engineers Handbook, Revised Edition, Chapters 2.10, 2.11, and 2.12, pp. 87–110 (1982).

U.S. patent appliction Ser. No. 09/394,728, Kleven, filed Sep. 13, 1999.

* cited by examiner

Primary Examiner—Harshad Patel
Assistant Examiner—Corey D. Mack
(74) Attorney, Agent, or Firm—Westman, Champlin & Kelly, P.A.

(57) ABSTRACT

A differential flow plate insertable into a flow path including a flow interrupter extending about an outer periphery of the flow path forming a constricted flow opening and a temperature sensor channel disposed proximate to the flow interrupter.

15 Claims, 13 Drawing Sheets

PROCESS FLOW PLATE WITH TEMPERATURE MEASUREMENT FEATURE

CROSS-REFERENCE TO RELATED APPLICATION

Reference is hereby made to co-pending application Ser. No. 09/394,728, filed Sep. 13, 1999 and entitled "PROCESS FLOW DEVICE WITH IMPROVED PRESSURE MEASUREMENT FEATURE".

BACKGROUND OF THE INVENTION

The invention relates to the fluid process measurement and control industry. The process measurement and control industry employs process variable transmitters to remotely monitor process variables associated with fluids such as slurries, liquids, vapors, gasses, chemicals, pulp, petroleum, pharmaceuticals, food and other food processing plants. Process variables include pressure, temperature, flow, level, turbidity, density, concentration, chemical composition and other properties.

Figure 1:
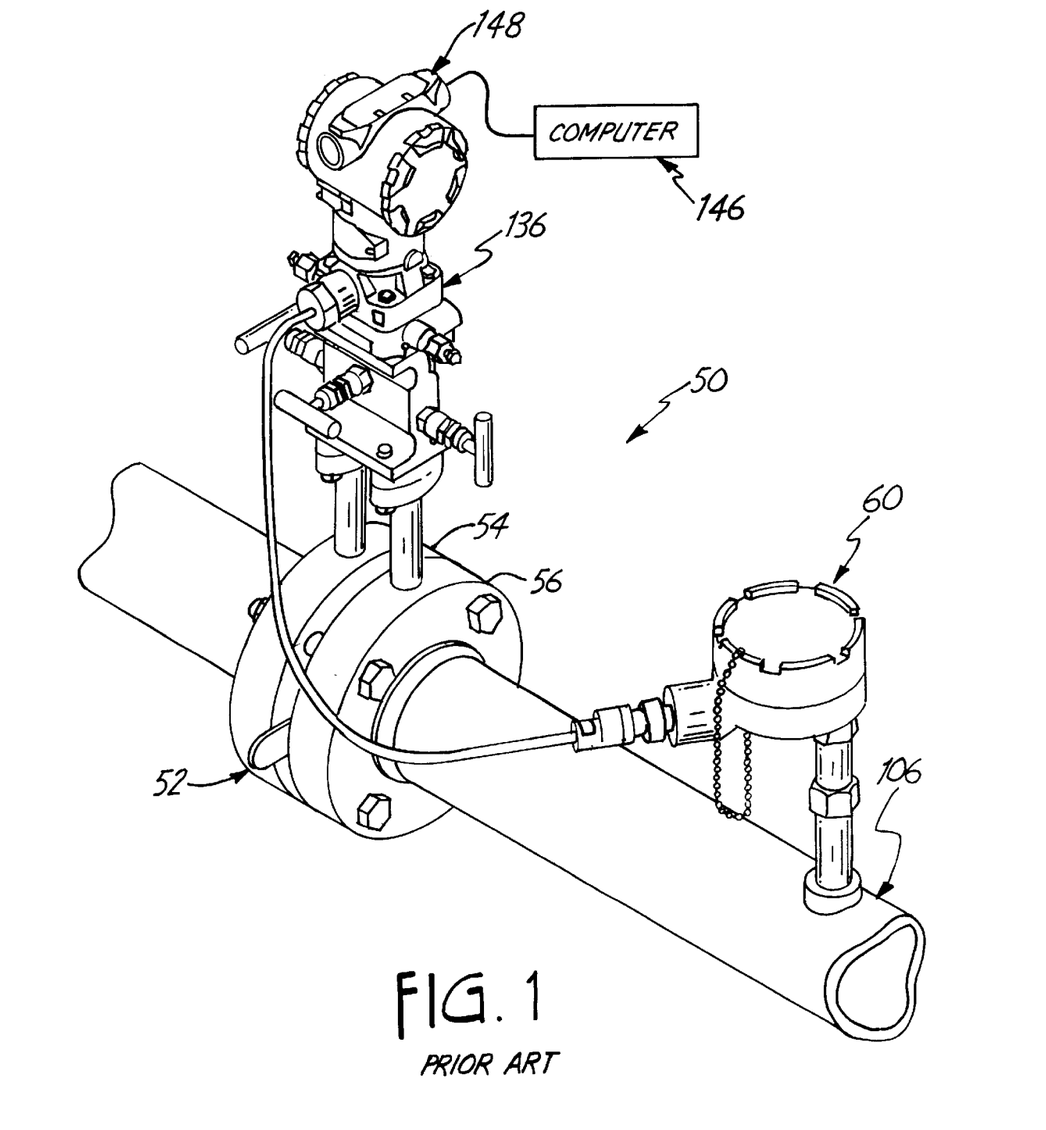
FIG. 1 is a perspective view of a prior art flow device with remote temperature sensing.

FIG. 1 illustrates a process flow device 50 for measuring process variables, such as pressure and flow. Device 50 includes a flow plate 52 clamped between pipe flanges 54, 56 and a remote temperature sensor 60. Mass flow rate for fluid flow is a function of:

$$Q = KaYF_a \sqrt{2g_c(\Delta p)(\rho)}$$

where:

Q—is the mass flow rate;

ρ—is the density of the fluid;

Δp—is the differential pressure across a flow constriction;

a—is the cross sectional area of the orifice;

Y—is a gas expansion factor;

$F_a$—is the area factor for thermal expansion of the orifice;

$g_c$—is a unit conversion factor; and

K—is a flow coefficient.

Density ρ of the fluid is a function of the temperature and pressure of the fluid. For compressible fluids, such as gases, pressure has a relatively large impact upon fluid density (ρ). Temperature variations influence mass flow rate calculation since mass flow rate is a function of the density ρ as well as the profile and dimension of the flow constriction. The profile and dimensions of the flow constriction change with temperature variations due to thermal expansion. In particular, fluid density is a function of at least temperature and metal orifice plates expand and contract with temperature changes.

In prior flow plate applications, temperature was measured remote from the flow plate 52. The remote temperature measurement was used to estimate the temperature proximate the flow constriction. The remote temperature measurement required separate pipe connections creating increased maintenance and installation complexity. Such added complexity increased field installation time due to increased assembly and testing time. Additionally, each sealed interface provides a potential location for the development of leaks due to the significant static pressure generally present within the pipe. Such leaks, also known as fugitive emissions are undesirable.

SUMMARY

A temperature sensing channel is disposed proximate a flow plate to provide reduced field installation time, cost, and complexity while potentially increasing device accuracy and longevity. Embodiments of the invention relate to a flow plate and a temperature sensor disposed proximate the flow plate in a sensing channel.

DETAILED DESCRIPTION

Figure 2:
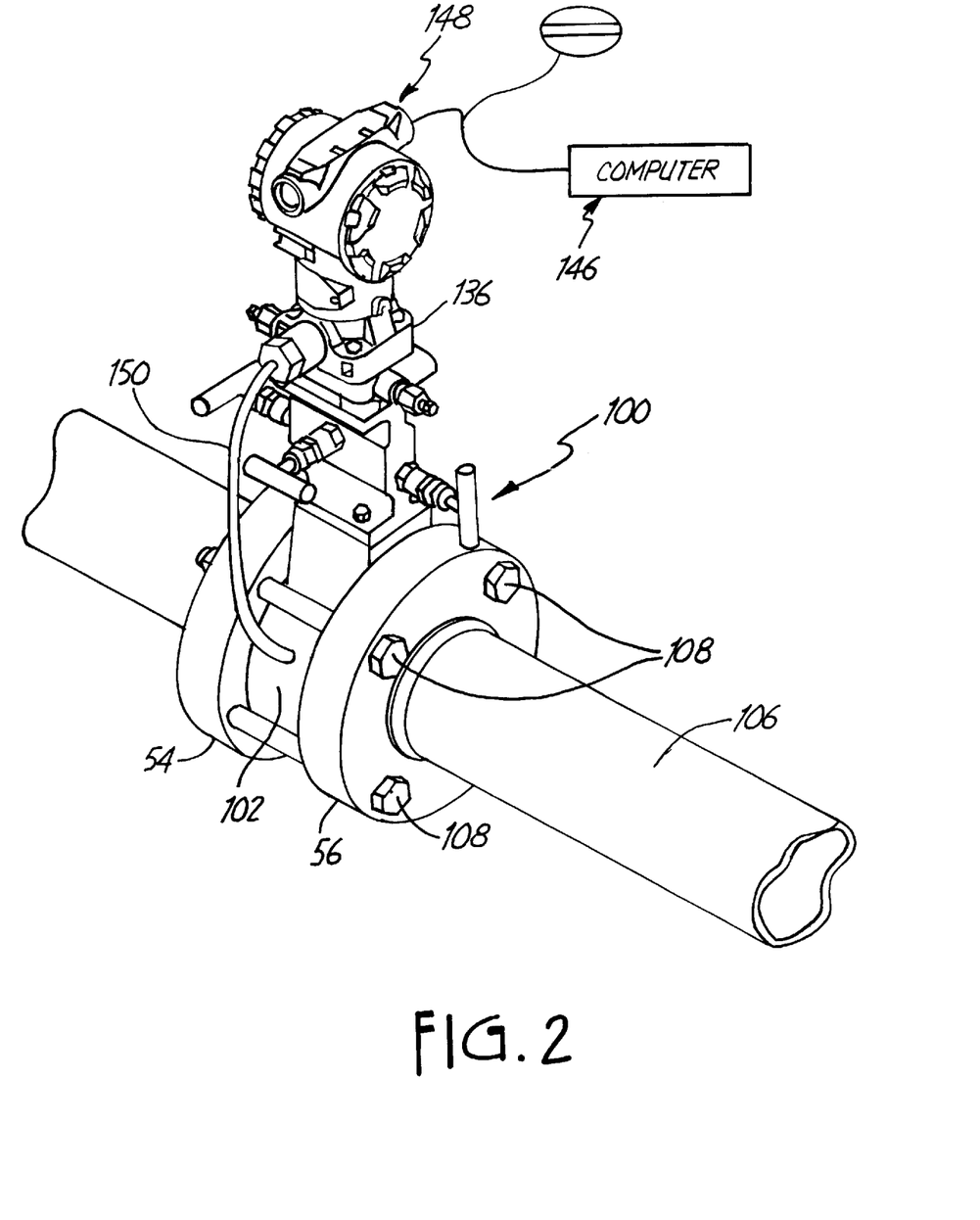
FIG. 2 is an environmental view of an embodiment of a flow plate device of the present invention.
Figure 3:
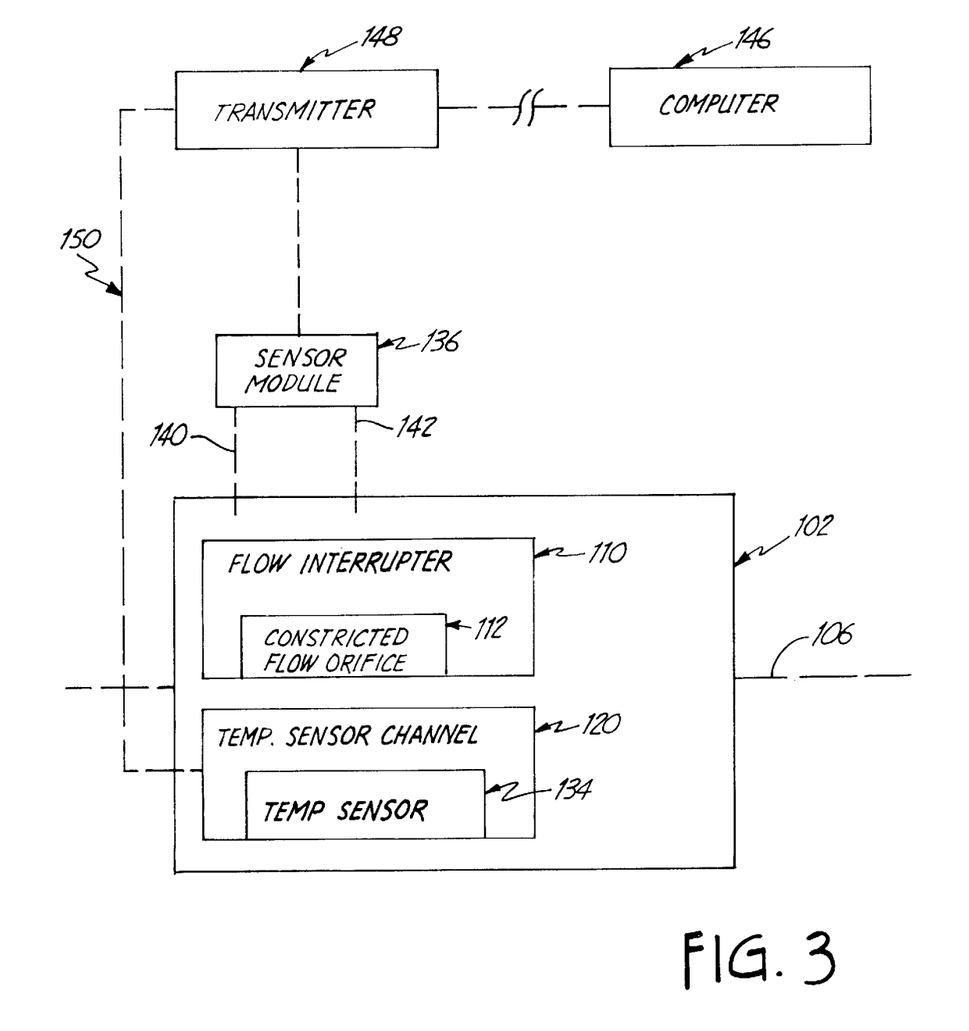
FIG. 3 is a schematic illustration of a flow plate device with integral temperature sensing.

FIGS. 2–3 illustrate the environment of a flow device 100 including flow plate 102 with integral temperature sensing. As shown, flow plate 102 is insertable between pipe flanges 54, 56 in a flow path 106 as shown in FIG. 2. In the embodiment shown, bolts 108 connect flanges 54, 56 to support flow plate 102 in flow path 106 or pipe. Alternate connections can be used to support flow plate 102 in flow path 106 and this application is not limited to the specific connection shown.

Figure 5:
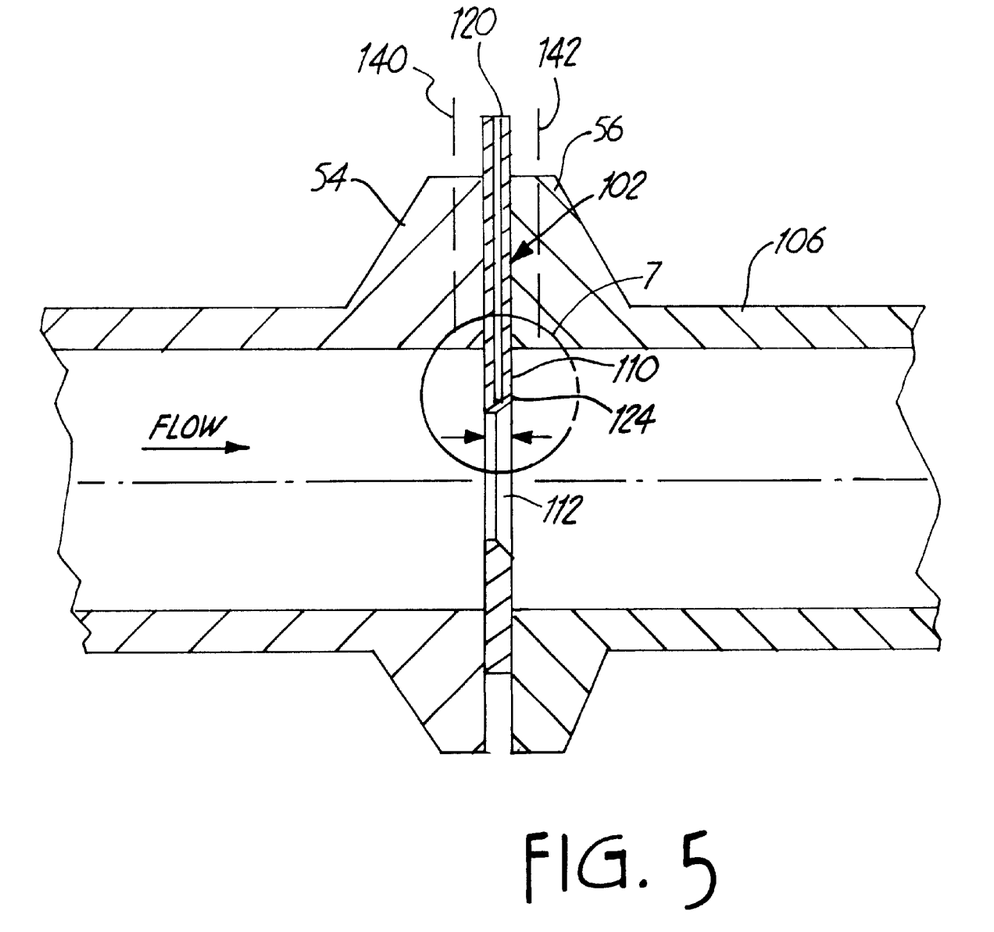
FIG. 5 is a cross-sectional view of the flow plate of FIG. 4 supported in a flow pipe.
Figure 9:
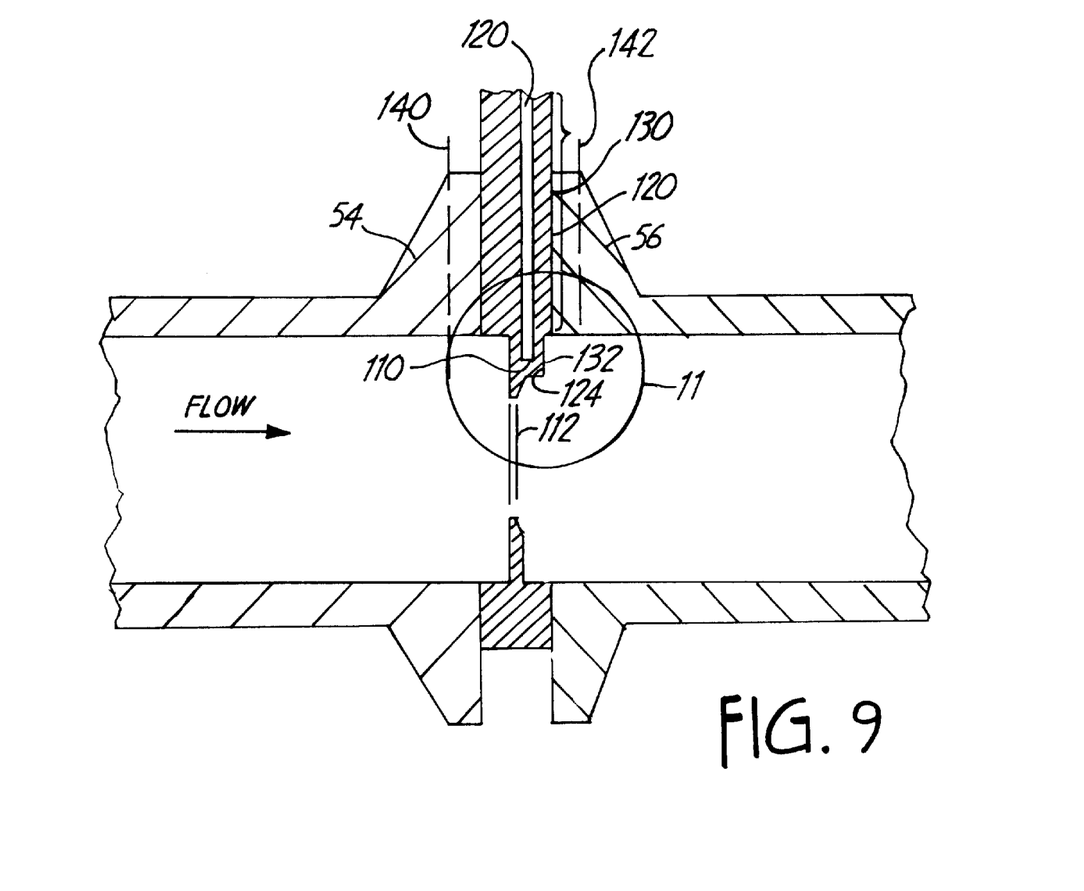
FIG. 9 is a cross-sectional view of the flow plate of FIG. 7 supported in a flow pipe.

Flow plate 102 includes a flow interrupter 110 extending about a periphery of flow path or pipe 106 surrounding a constricted flow opening 112 as illustrated in FIGS. 3, 5 and 9. In FIGS. 3, 5 and 9 flow plate 102 is an orifice plate having a constricted flow orifice. Alternate flow interrupter 110 can be a nozzle plate (not shown) having a constricted nozzle opening (not shown) and flow interrupter 110 is not limited to an orifice plate. Detailed descriptions of various orifice plates and nozzle plates are described in Liptak, Beto, *Instrument Engineer's Handbook: Process Measurement and Analysis*, 3rd Ed., Chilton Book Company (1995) and Miller, Richard, *Flow Measurement Engineering Handbook*, 3rd Ed., McGraw-Hill, Inc. (1996).

Figure 4:
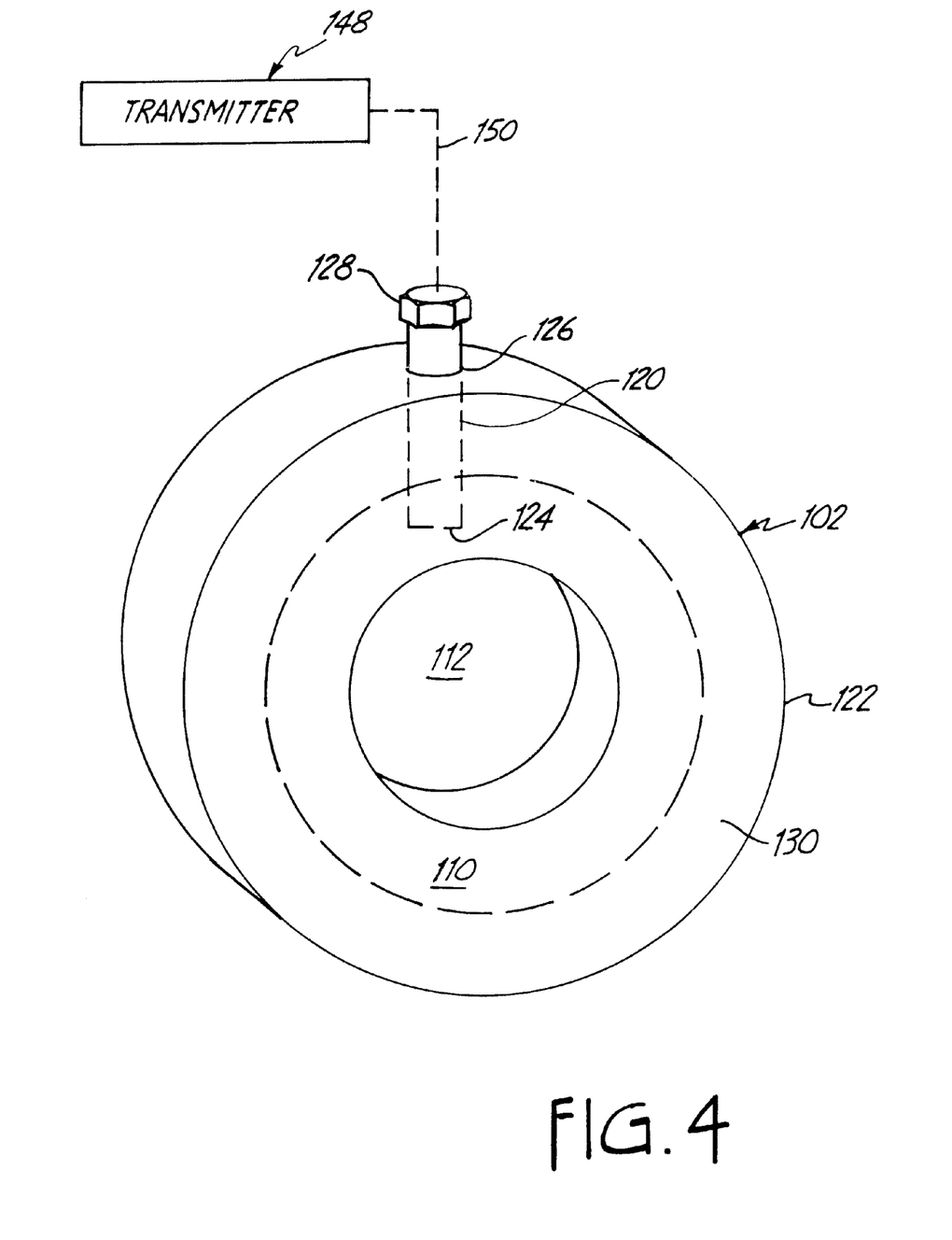
FIG. 4 is a perspective illustration of an embodiment of a flow plate with integral temperature sensing.
Figure 7:
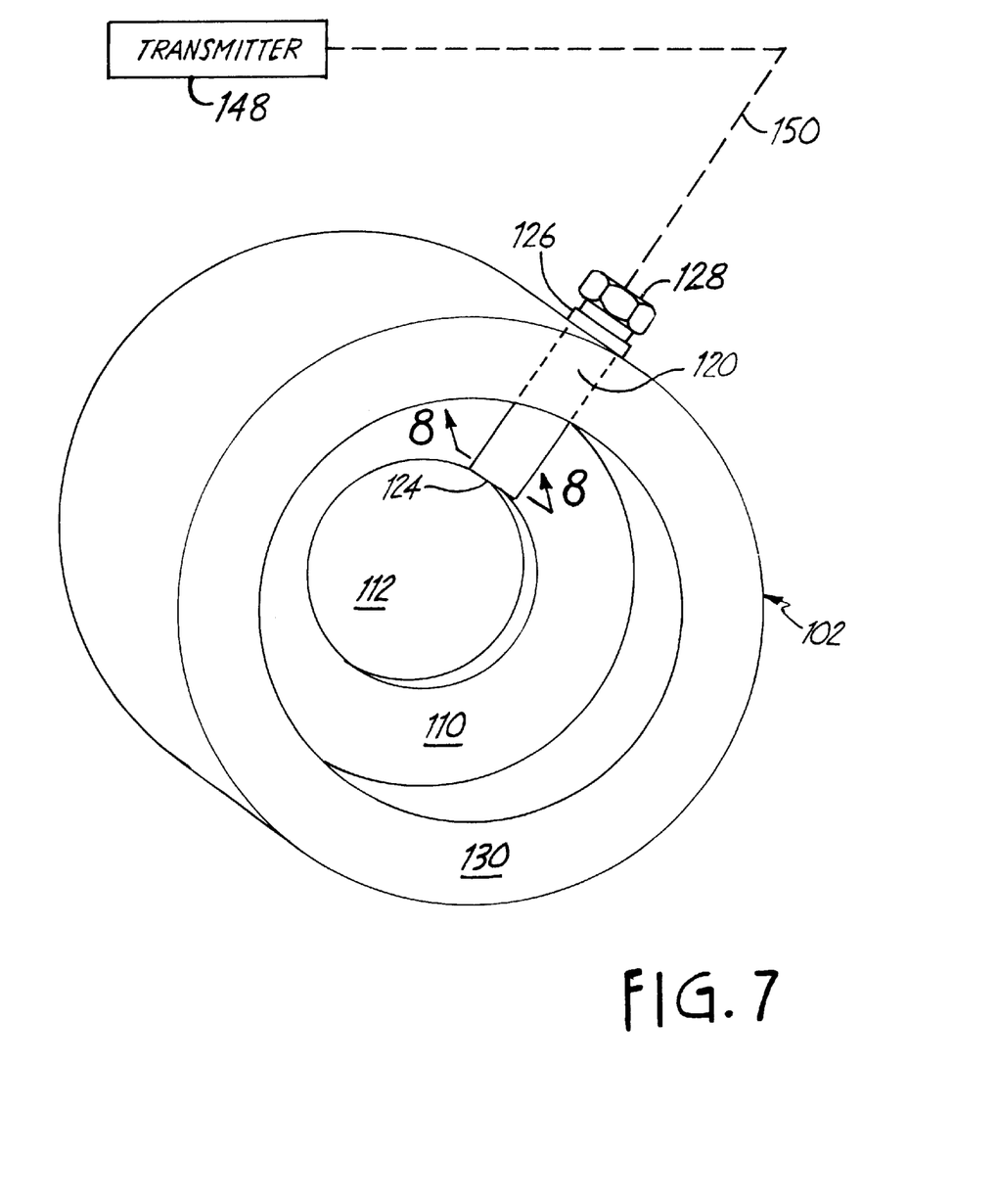
FIG. 7 is a perspective illustration of an embodiment of a flow plate with integral temperature sensing.
Figure 8:
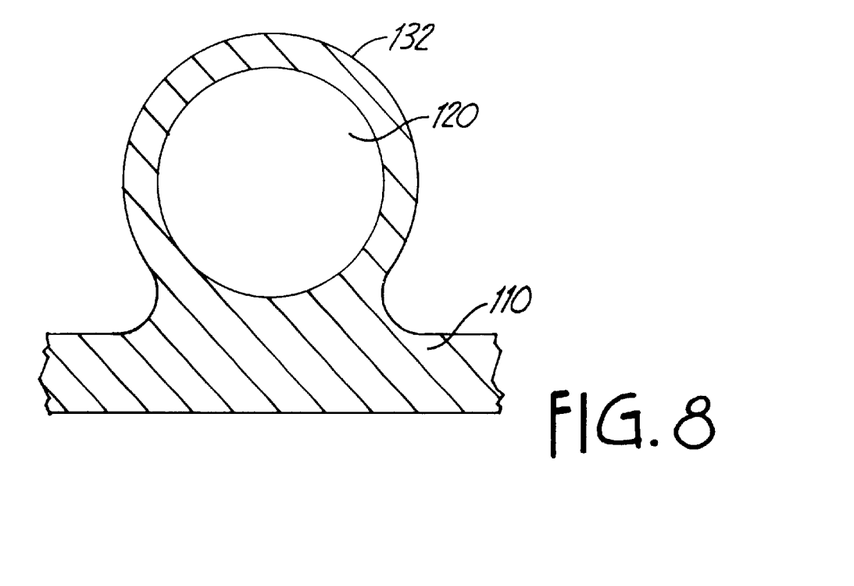
FIG. 8 is a cross-sectional view along line 8—8 of FIG. 7.

Flow plate 102 can include a temperature sensor channel 120 that extends through the flow plate 102 proximate to the flow interrupter 110. However, if temperature sensor channel 120 is not included in flow plate 102, channel 120 should be disposed for thermal communication with plate 102. Temperature sensor channel 120 extends from an outer periphery 122 of flow plate 102 as illustrated in FIGS. 4 and 7 proximate to the constricted flow opening 112. The sensor channel 120 extends a sufficient distance to measure temperature of constricted flow.

In the embodiment shown, an extended end 124 of temperature sensor channel 120 is closed to protect sensing elements (for example, a resistive temperature device) from exposure to fluids. Port 126 to sensor channel 120 on outer periphery 122 is sealed by closure 128. In one embodiment, closure 128 is a Swagelok® fitting for sealing a temperature probe in the sensor channel 120. However, closure 128 can be any suitable known closure. For application, temperature sensor channel 120 is closed to meet explosion proof and intrinsic safety requirements.

Figure 6:
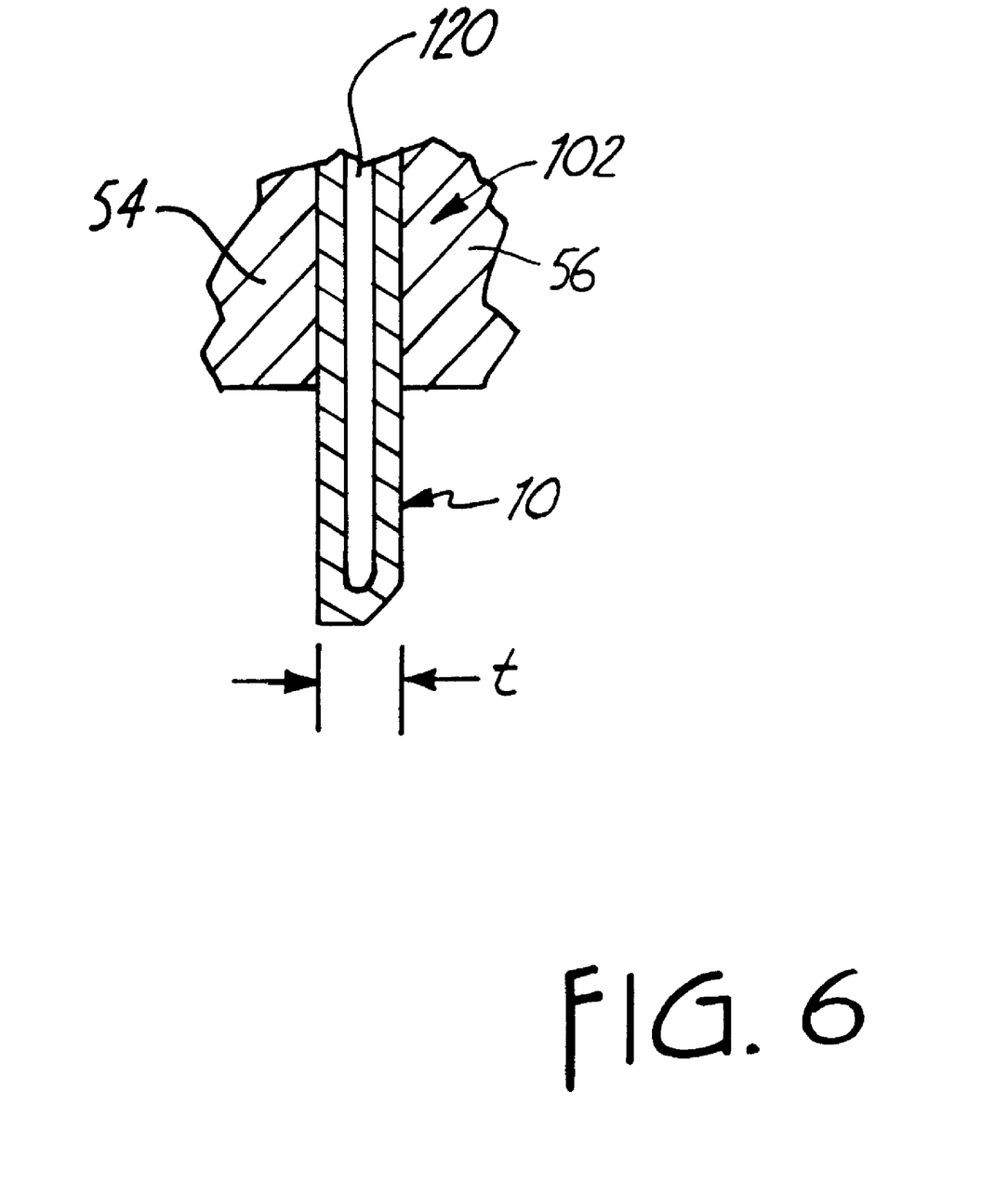
FIG. 6 is a detailed illustration of portion 7 of FIG. 5.

Orifice plates and other flow interrupter 102 have dimension standard requirements as published in International Standards ISO 5167-1. The thickness -t- (FIGS. 7 and 11) of the orifice plate and flow interrupter 102 is a function of pipe dimensions or diameter. FIGS. 4–6 illustrate an embodiment of flow plate 102 for a large diameter pipe and FIGS. 7–10 illustrate a flow plate 102 adapted for a small diameter pipe. In the embodiment shown in FIGS. 4–6, flow plate is flat having a base portion 130 for clamping between pipe flanges 54, 56 and a flow interrupter 110 supported in the flow path 106. The thickness -t- of the flow plate is sufficient to form temperature sensor channel 120 through base portion 130 and flow interrupter 110 to locate a temperature sensor proximate to constricted opening 112 and the flow interrupter 110.

Figure 10:
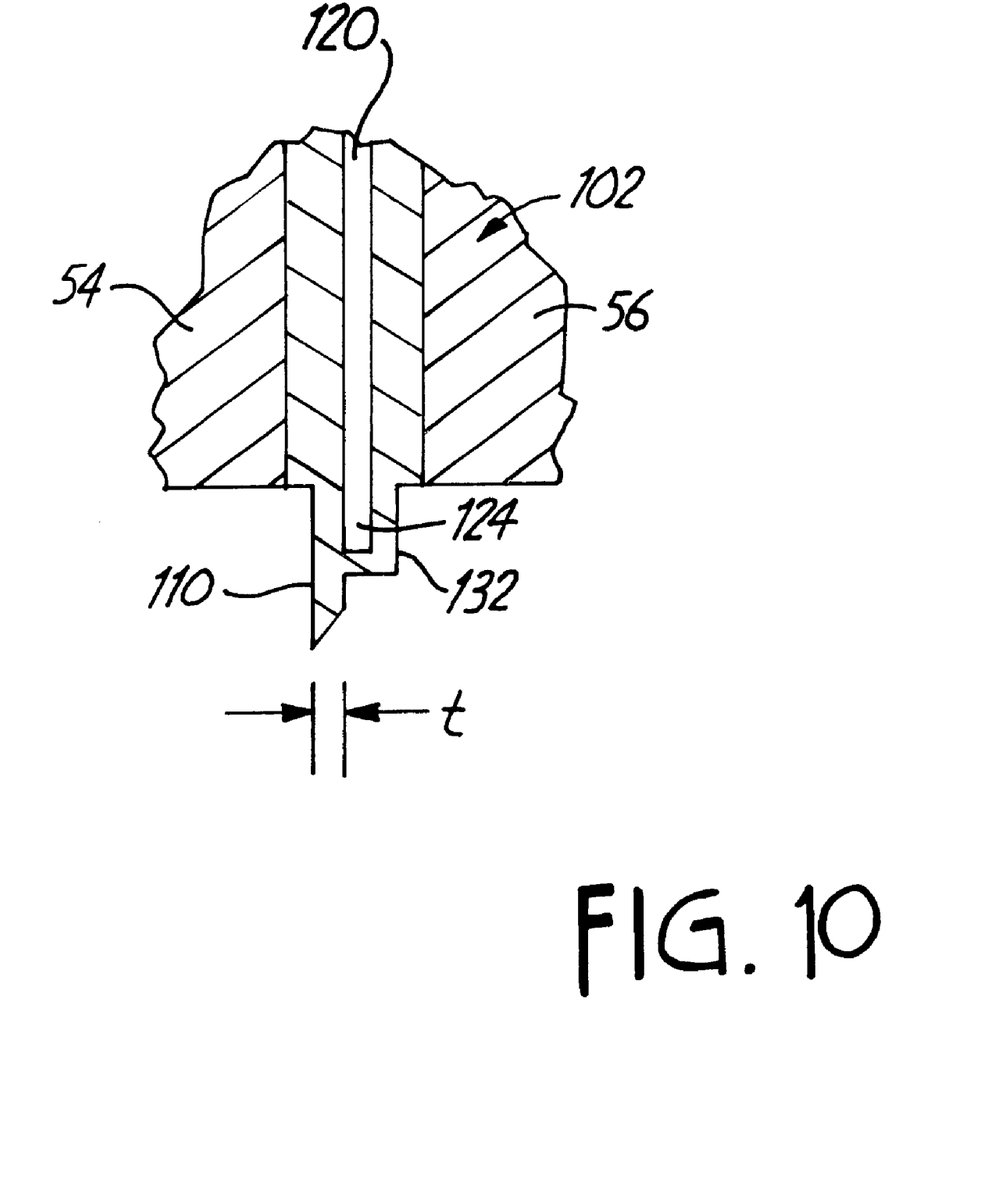
FIG. 10 is a detailed illustration of portion 11 of FIG. 9.

In the embodiment shown in FIGS. 7–10, flow plate is stepped to include a thicker base portion 130 to accommodate sensor channel 120 for small pipe diameters or sizes. As shown in FIGS. 7–10, sensor channel 120 extends through base portion 130 and a portion of sensor channel 120 is formed on the back side of the flow interrupter 110 (low pressure side) to support a temperature sensor proximate to the flow constriction as illustrated in FIGS. 9–10. Sensor channel 120 can be formed through a raised bulb 132 on the back side of the flow interrupter 110 by known manufacturing or casting techniques.

Temperature sensor 134, illustrated schematically in FIG. 3, is inserted into sensor channel 120 for temperature measurement. The temperature sensor 134 can be a commercially available resistive temperature device having a dimension between approximately ⅛ in–¼ in., available for example, from Omega Engineering of Stamford, Conn. or Fisher-Rosemount Inc. of Eden Prairie, Minn. Alteratively, temperature sensor 134 can be a thermocouple having a dimension range approximately between 1/16 in.–⅜ in. available for example, from Omega Engineering of Stamford, Conn.

Flow plate 102 creates a differential pressure across flow constriction 112. Pressure sensor module 136 as illustrated in FIGS. 2 and 3 measures differential pressure across constriction 112. Differential pressure is transmitted to sensor module 136 through pressure taps 140, 142 illustrated schematically in FIGS. 3, 5 and 9 on opposed sides of the flow plate 102. Output from sensor module 136 is uploaded to a computer or other device 146 for process calculations. For example, output from sensor module 136 is coupled to transmitter 148, such as a Rosemount Model Transmitter 3095 MV available from Fisher-Rosemount, Inc. of Eden Prairie, Minn., for transmission to a remote computer 146 or distributed control system. As shown in FIGS. 2 and 3, sensor leads 150 electrically connect temperature sensor 134 to a processor or transmitter 148 for process calculations.

Process variable transmitter 148 provides an output related to the sensed process variable over a process control loop to a control room or computer 146, such that the process can be monitored and controlled. The process control loop can be a two-wire, 4–20 mA process control loop. The control loop may also have digital signals superimposed on the two-wire loop according to a process industry standard protocol such as the HART® ("Highway Addressable Remote Transducer") digital protocol, as described in HART® Field Communications Protocol, "A Technical Overview" available from HART® Communication Foundation, Austin, Tex. 78759-6540. Local process control devices are connected to process control, for example, through a fieldbus interface and network system as described in "Fieldbus Technical Overview" available from Fisher-Rosemount Systems, Inc., Eden Prairie, Minn. In some embodiments, transmitters 148 can meet intrinsic safety requirements.

Figure 11:
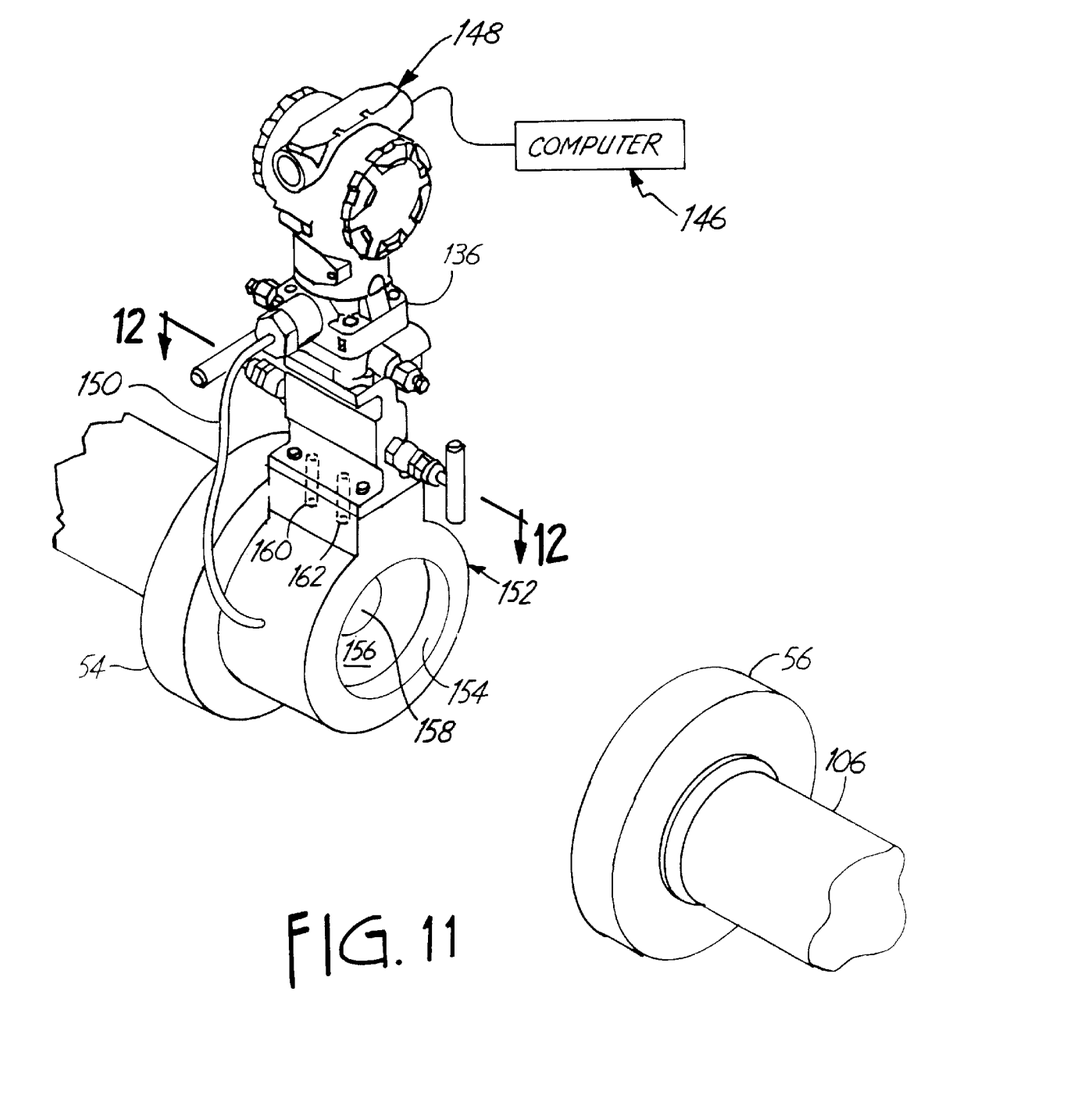
FIG. 11 is a perspective illustration of a flow plate with integral temperature sensing.
Figure 12:
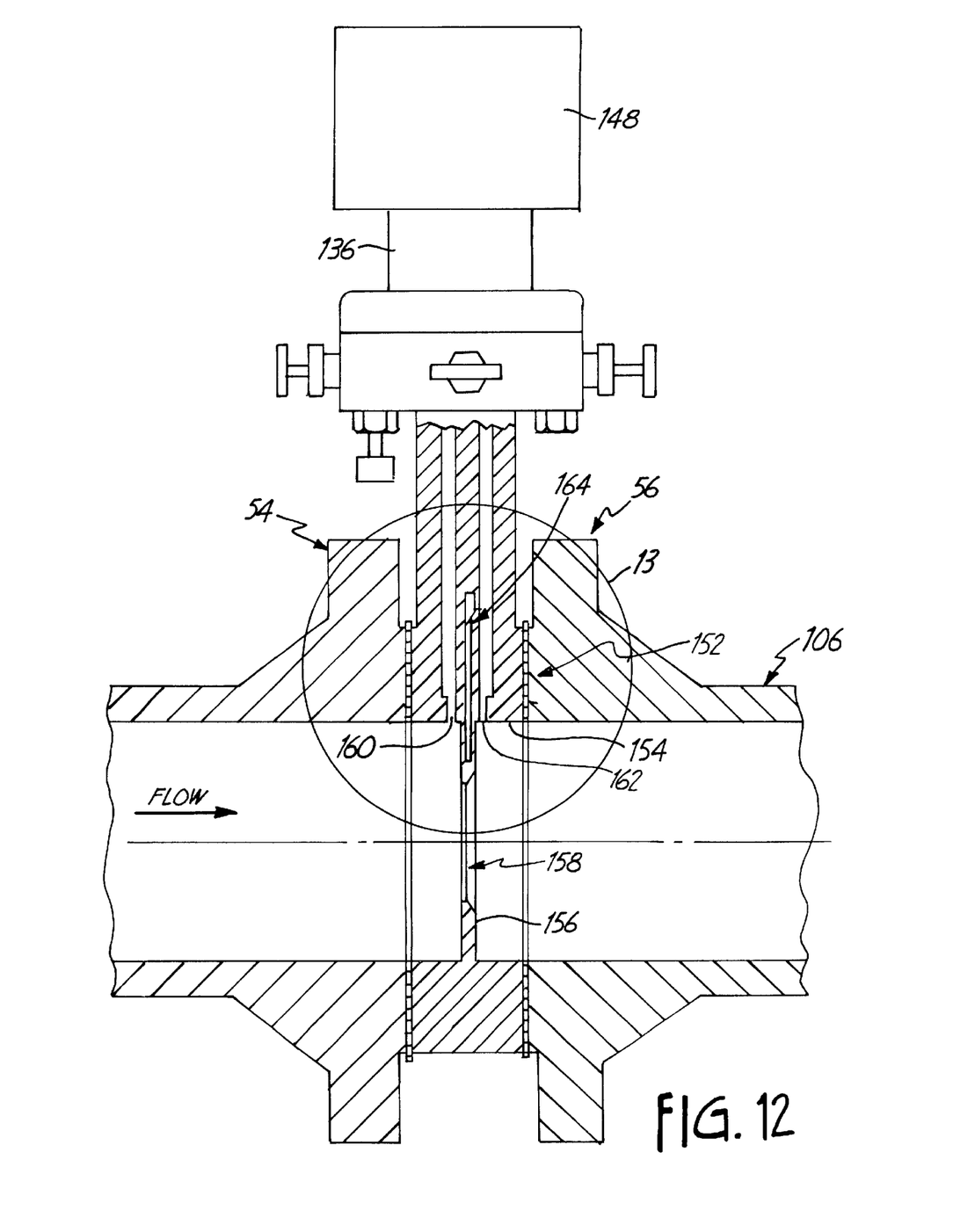
FIG. 12 is a cross sectional view of the flow plate of FIG. 11 supported in a flow pipe.
Figure 13:
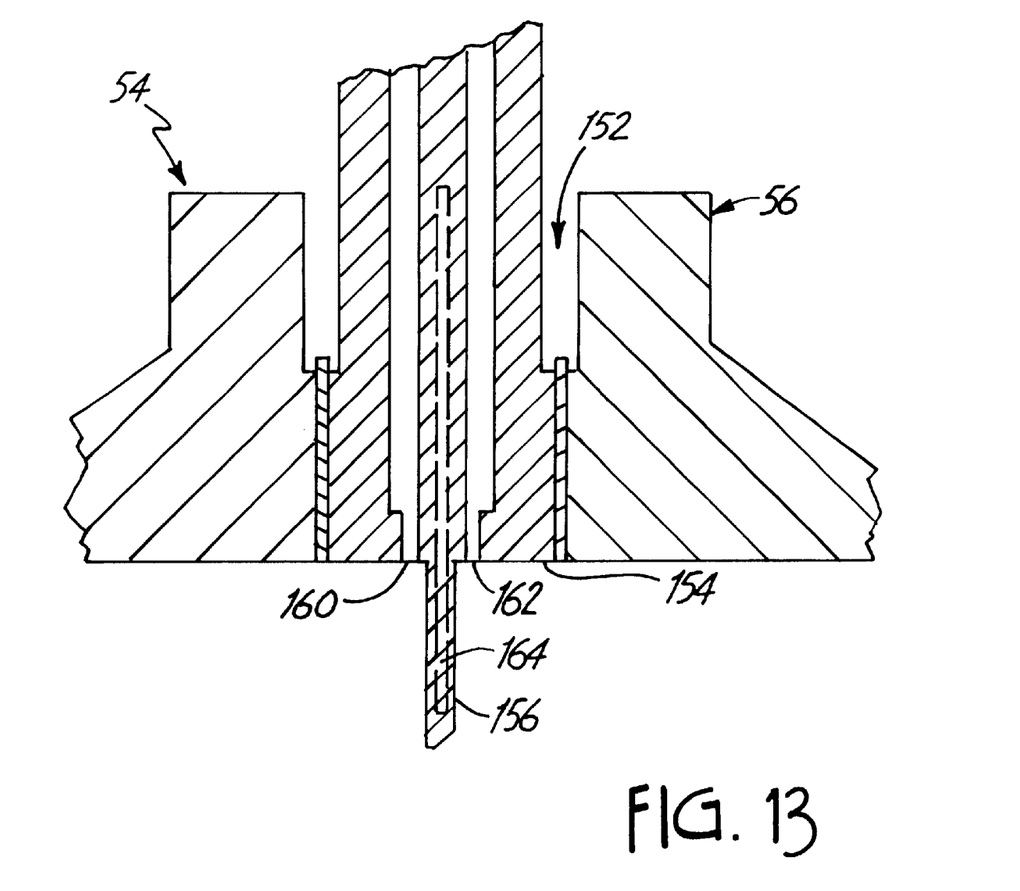
FIG. 13 is a detailed illustration of section 13 of FIG. 12.

Pressure taps 140, 142 can be formed integral with the flow plate as illustrated in FIGS. 11–13. As shown in FIGS. 11–13, flow plate 152 includes a conduit 154 supporting flow interrupter 156 forming constricted flow orifice 158. Flow conduit 154 includes pressure taps 160, 162. The flow conduit 154 is seamless between the flow interrupter 156 and pressure tap 160, 162 which limits pressure loss or drop through seams between pressure taps 160, 162 and flow interrupter 156. The seamless interface between pressure taps 160, 162 and flow interrupter 156 reduces non-attributable pressure loss not related to the flow rate or flow constriction which can degrade measurement accuracy and increase the likelihood of fugitive emissions described in copending application Ser. No. 09/394,728, filed Sep. 13, 1999, and entitled "PROCESS FLOW DEVICE WITH IMPROVED PRESSURE MEASUREMENT FEATURE". Flow plate 152 is inserted and supported between pipe flanges 54, 56 and includes a temperature sensor channel 164, illustrated in phantom in FIGS. 12–13, extending from an outer periphery of the flow plate 152 into the flow interrupter 156 as shown. The sensor channel 164 extends a sufficient distance to measure flow temperature proximate to the constriction 158.

Figure 14:
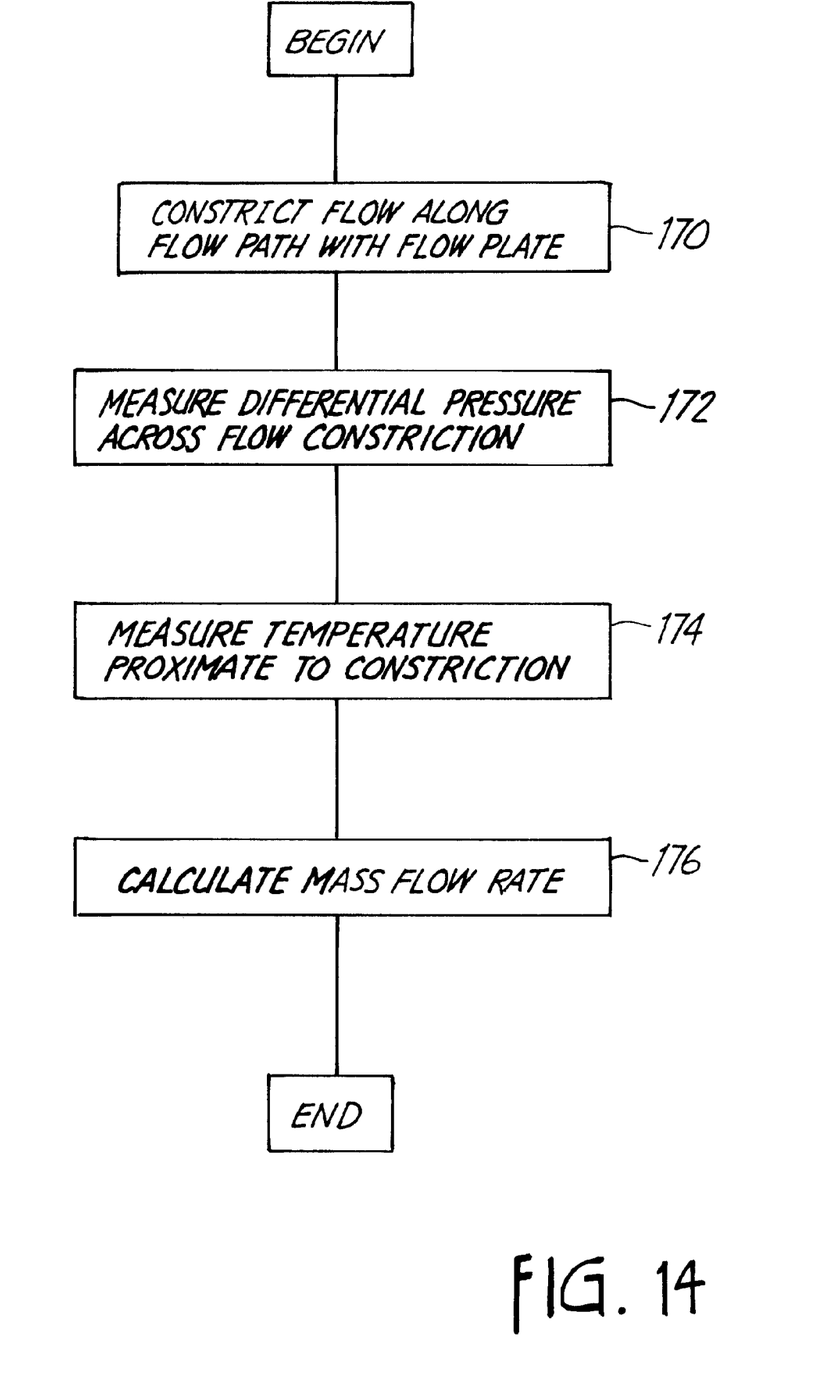
FIG. 14 is a flow chart of mass flow measurement with integral temperature sensing.

In operation as illustrated in FIG. 14, flow is constricted through constricted flow orifice 112 of flow plate 102 to create a differential pressure as illustrated in block 170. Differential pressure tap 140, 142 illustrated schematically in FIG. 3 on opposed sides of flow interrupter 110 are coupled to sensor module 136 to convey pressure for differential pressure measurement as illustrated in block 172. Temperature is measured at the flow constriction as illustrated by block 174 and mass flow rate is calculated based upon measured pressure differential, static pressure and temperature at the flow constriction as illustrated by block 176. Differential pressure is the pressure developed across orifice 112 in response to fluid flow, while static pressure is present within the pipe even when fluid is not flowing.

Although the present invention has been described with reference to preferred embodiments, workers skilled in the art will recognize that changes may be made in form and detail without departing from the spirit and scope of the invention. For example, suitable temperature correction factors can be used to relate to the temperature measured with embodiments of this invention to those locations recommended by standards such as ISO 5167-1.

What is claimed is:

1. A flow plate with a temperature measurement feature insertable into a flow path comprising:

a flow interrupter extending about an outer periphery of the flow path forming at least one constricted flow opening; and a temperature sensor channel enclosed within the flow interrupter, wherein the temperature sensor channel includes a temperature sensor.

2. The flow plate of claim 1 wherein flow plate includes a sensor channel closure.

3. The flow plate of claim 1 wherein the temperature sensor is a resistive temperature device.

4. The flow plate of claim 1 wherein the temperature sensor is a thermocouple.

5. The flow plate of claim 1 including a flow conduit supporting the flow interrupter and the flow conduit including first and second pressure taps on opposed sides of the flow interrupter and the flow conduit is seamless between the flow interrupter and the first and second pressure taps.

6. A flow device with high temperature sensing feature comprising:

a flow plate including a flow interrupter extending about an outer periphery of a flow pipe forming at least one constricted flow opening;

a temperature sensor channel enclosed within the flow interrupter wherein the temperature sensor channel includes a temperature sensor;

first and second pressure taps on opposed sides of the flow interrupter;

a pressure sensor coupled to the first and second pressure taps; and a transmitter coupled to the sensor.

7. The flow device of claim 6 wherein the temperature sensor channel includes a temperature sensor.

8. The flow device of claim 7 wherein the temperature sensor is electrically coupled to the transmitter.

9. The flow device of claim 7 wherein the temperature sensor is electrically coupled to a computer.

10. The flow device of claim 6 wherein the transmitter is electrically coupled to a distributed control system.

11. The flow plate of claim 6 wherein the transmitter is electrically coupled to a computer.

12. The flow device of claim 6 including a flow conduit supporting the flow interrupter and first and second pressure taps, the flow conduit is seamless between the flow interrupter and first and second pressure taps.

13. A method for measuring process variables comprising:

constricting flow of fluid along a flow path with a flow plate;

measuring differential pressure across the constricted flow; and measuring temperature of the constricted flow proximate a constriction point wherein a temperature sensor is enclosed within the flow plate.

14. The method of claim 13 further comprising:

transmitting measured differential pressure and temperature of constricted flow to a computer.

15. The method of claim 14 further comprising:

calculating mass flow rate based upon measured differential pressure and temperature.

* * * * *